No. 658,535. Patented Sept. 25, 1900.
J. WAGNER.
CORN HARVESTER.
(Application filed Nov. 17, 1899.)
(No Model.) 2 Sheets—Sheet 1.
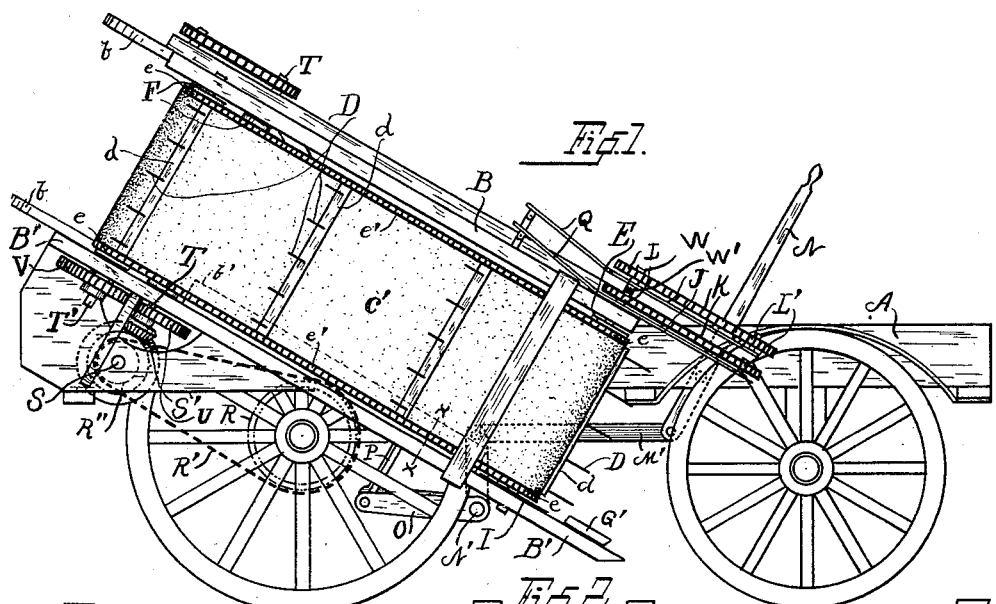
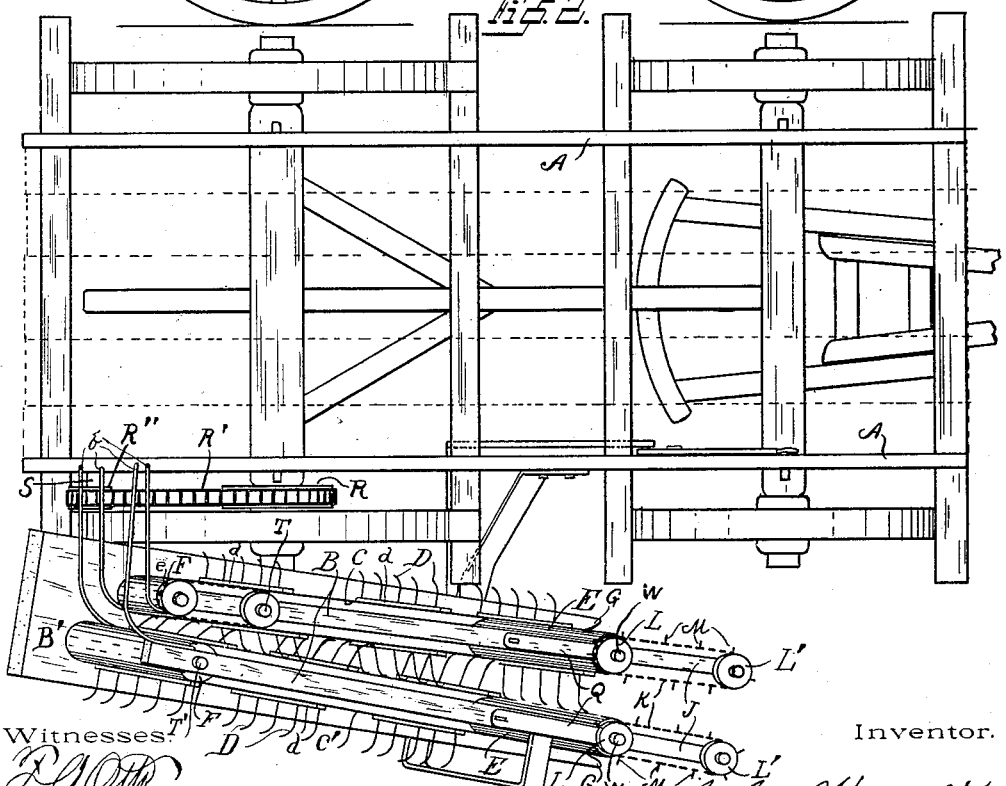
Witnesses: Inventor.
John Wagner
By Brion Wheeler & Wheeler
Attorneys

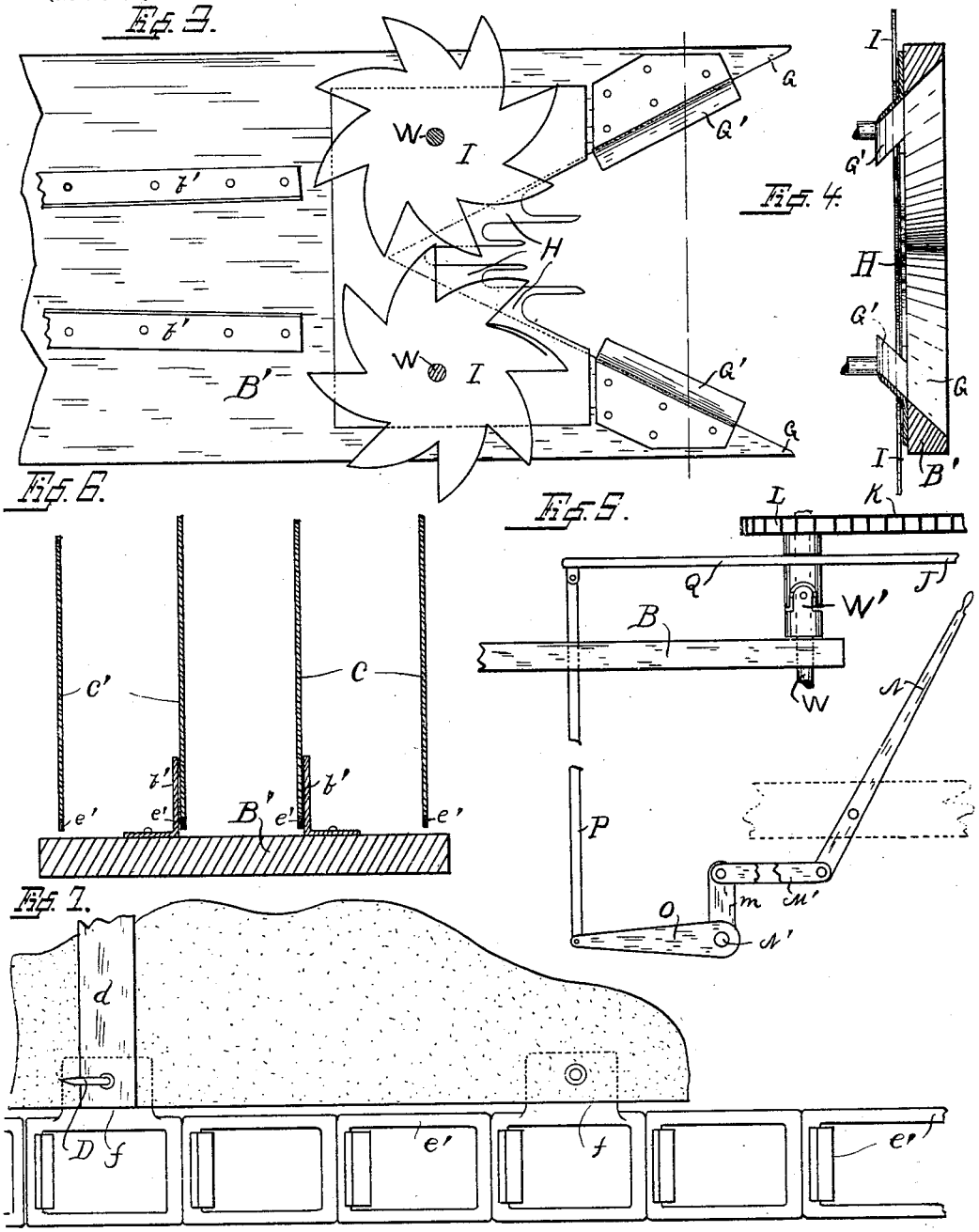

UNITED STATES PATENT OFFICE.

JOHN WAGNER, OF PORTAGE, WISCONSIN.

CORN-HARVESTER.

SPECIFICATION forming part of Letters Patent No. 658,535, dated September 25, 1900.

Application filed November 17, 1899. Serial No. 737,293. (No model.)

*To all whom it may concern:*

Be it known that I, JOHN WAGNER, a citizen of the United States, residing at Portage, in the county of Columbia and State of Wisconsin, have invented new and useful Improvements in Corn-Harvesters, of which the following is a specification.

The invention relates to improvements in corn-harvesters, and pertains especially to that class of harvesters shown and described in Letters Patent No. 295,602, issued to me on the 25th day of March, 1884.

The object of my invention is to provide more adequate means for gathering, cutting, and conveying the cornstalks.

In the drawings, Figure 1 is a side elevation of my invention, showing the same attached to a wagon in position for use. Fig. 2 is a top view of the same. Fig. 3 is a detail top view of the cutting-knives. Fig. 4 is a sectional view of the forward cutters. Fig. 5 is a detail side view of one of the gatherers, showing its toggle connection with the belt-roller. Fig. 6 is a sectional view drawn on line *x x* of Fig. 1. Fig. 7 is a detail view of the sprocket-links, showing their attachment to the apron.

Like parts are identified by the same reference-letters throughout the several views.

A represents a wagon to which my invention is attached, the box being especially constructed with a view to the retention of the cornstalks.

B is a conveyer-frame secured to the wagon in a diagonal position, as shown in Fig. 1, and provided with a floor B', Fig. 3. A conveyer is formed of two endless belts or aprons C C', each provided with transverse rows of spines D and supported by end rollers E E and F F. The rollers are provided with sprocket-wheels *e*, and apron-supporting sprocket-chains *e'* are used to prevent the aprons from sagging between the rollers, the sprocket-chains being provided with projecting ears *f*, Fig. 7, which are riveted to the aprons. The spines D are preferably curved in the opposite direction to that of the movement of the aprons. A convenient method of attaching these spines is by securing cross-bars *d* to the aprons and bolting or riveting the spines thereto.

It will be observed, Fig. 2, that the apron C next to the wagon is shorter than the outer one, which projects farther to the rear, and that the frame B is provided with curved guide-fingers *b*, the free ends of which project inwardly to the wagon-box, whereby the stalks carried up by the spined aprons are guided inwardly by the fingers *b* and delivered to the wagon. It will also be observed that the aprons converge at their rear ends, whereby they tend to gather the stalks at various inclines at the front end of the conveyer and bring them to an upright position at the rear end. The frame is provided between the aprons with shields *b'*, which support the lower edges of the aprons against the pressure of the heavy butt-ends of the stalks.

For cutting the stalks I have provided the frame with a fork G, on the sides of which are located cutting-knives G', the cutting edges of which are bent upwardly in a position to cut the stalks diagonally on contact of the latter therewith. In the angle of the fork I have provided a multiple-fingered shear-plate H, and interacting toothed rotary cutters I, secured to the rollers E E, are adapted to move over the shear-plate H to sever all the stalks uncut by the knives G'.

In order to lift the inclined stalks and insure their being caught by the conveyer, I have provided the conveyer with adjustable gatherers supported by a tilting frame J from the front end of the frame B. The gatherers consist in sprocket-chains K, running over sprocket-wheels L L' at the respective ends of the frame and provided with spines M. The frames are tilted to the desired angle by means of a lever N, from which a tilting motion is communicated to the frames through the link M', arm *m*, rock-shaft N', arm O, connecting-rod P, and lever Q. The frames can thus be raised or lowered to correspond with the general inclination of the stalks.

Motion is communicated to the shorter apron of the conveyer from one of the wagon-wheels through the sprocket-wheel R, chain R', wheel R'', shaft S, bevel-gears S', and shaft T, the roller F of the apron being secured to this shaft. A gear-wheel U, fast on the shaft T, communicates motion from this shaft to the shaft T' of the other conveyer-roller F through a gear-wheel V. Motion is also communicated from both the rollers F to the rollers E and rotary cutters through the connecting sprocket-chains and aprons and from the rollers E to the sprocket-chains of the gatherers through the shafts W of the rollers E, knuckles W', and the sprocket-wheels.

Having thus described my invention, what I claim as new, and desire to secure by Letters Patent, is—

1. In a corn-harvester, the combination with a conveyer-frame; of a plurality of revolving belts or aprons, provided with spines and arranged to form a conveyer; of a fork projecting from the front end of the conveyer or frame; rotary, toothed interacting cutters located at the crotch of said fork; and a fingered shear located underneath the teeth of said cutters; together with cutting-knives disposed along the sides of said fork, with their cutting edges turned upwardly at an angle to the plane of their attachment to the fork.

2. In a corn-harvester, the combination with a conveyer-frame; of a plurality of revolving conveyer belts or aprons, extending around end rollers journaled in the frame; toothed, interacting cutters secured to the roller-shafts at the front end of said conveyer; sprocket-pulleys secured to the upper ends of said shafts by knuckle-joints; and revolving sprocket-chains running over said pulleys and extending forwardly from said conveyer, said chains being provided with inwardly-projecting spines; together with means for adjusting the sprocket-chains at various angles.

In testimony whereof I affix my signature in the presence of two witnesses.

JOHN WAGNER.

Witnesses:
JAS. B. ERWIN,
LEVERETT C. WHEELER.